US 11,566,187 B2

(12) United States Patent
Patrick et al.

(10) Patent No.: US 11,566,187 B2
(45) Date of Patent: *Jan. 31, 2023

(54) HIGH PERFORMANCE PROCESS OIL BASED ON DISTILLED AROMATIC EXTRACTS

(71) Applicant: Ergon, Inc., Jackson, MS (US)

(72) Inventors: John Kristopher Patrick, Brandon, MS (US); Craig Alan Busbea, Jackson, MS (US); Edward William Casserly, Madison, MS (US); Howard Don Davis, Ridgeland, MS (US)

(73) Assignee: ERGON, INC., Jackson, MI (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/572,740

(22) PCT Filed: May 11, 2016

(86) PCT No.: PCT/US2016/031857
§ 371 (c)(1),
(2) Date: Nov. 8, 2017

(87) PCT Pub. No.: WO2016/183200
PCT Pub. Date: Nov. 17, 2016

(65) Prior Publication Data
US 2018/0112141 A1    Apr. 26, 2018

Related U.S. Application Data

(60) Provisional application No. 62/160,089, filed on May 12, 2015.

(51) Int. Cl.
*C10G 67/04* (2006.01)
*C10G 67/02* (2006.01)
(Continued)

(52) U.S. Cl.
CPC ............... *C10G 67/02* (2013.01); *C08L 9/06* (2013.01); *C10G 45/02* (2013.01); *C10G 45/32* (2013.01);
(Continued)

(58) Field of Classification Search
CPC ........ C10G 67/00; C10G 67/02; C10G 67/04; C10G 67/0481; C10G 2300/302;
(Continued)

(56) References Cited

U.S. PATENT DOCUMENTS 3,425,932 A * 2/1969 Kirby, Jr. ............... C10G 45/02
208/143
3,732,154 A * 5/1973 Mills ...................... C10G 45/68
208/14

(Continued)

FOREIGN PATENT DOCUMENTS

| CA | 2311077 | 12/2001 |
|---|---|---|
| CN | 101063 047 | 10/2007 |

(Continued)

OTHER PUBLICATIONS

Meririam-Webster, paraffin distillate definition, accessed on Aug. 18, 2021 "https://www.merriam-webster.com/dictionary/paraffin%20distillate". (Year: 2021).*

(Continued)

*Primary Examiner* — Michelle Stein
(74) *Attorney, Agent, or Firm* — Patterson Thuente, P.A.; David R Cleveland (57) ABSTRACT

Naphthenic process oils are made by blending one or more naphthenic vacuum gas oils in one or more viscosity ranges with a high $C_A$ content distilled aromatic extract feedstock to provide at least one blended oil, and hydrotreating the at least one blended oil to provide an enhanced $C_A$ content (Continued)

naphthenic process oil. The order of the vacuum distillation and blending steps may be reversed.

16 Claims, 5 Drawing Sheets

(51) Int. Cl.
| | |
|---|---|
| *C08L 9/06* | (2006.01) |
| *C10G 45/02* | (2006.01) |
| *C10G 45/32* | (2006.01) |
| *C10G 45/44* | (2006.01) |
| *C10G 67/14* | (2006.01) |

(52) U.S. Cl.
CPC ............ *C10G 45/44* (2013.01); *C10G 67/04* (2013.01); *C10G 67/0436* (2013.01); *C10G 67/0481* (2013.01); *C10G 67/14* (2013.01); C10G 2300/107 (2013.01); C10G 2300/1074 (2013.01); C10G 2300/1077 (2013.01); C10G 2300/202 (2013.01); C10G 2300/301 (2013.01); C10G 2300/302 (2013.01)

(58) Field of Classification Search
CPC ........ C10G 45/02; C10G 45/32; C10G 45/44; C10G 45/14
See application file for complete search history.

(56) References Cited

U.S. PATENT DOCUMENTS

| | | | | |
|---|---|---|---|---|
| 3,904,507 | A * | 9/1975 | Mills | C10G 69/00 208/14 |
| 4,100,056 | A * | 7/1978 | Reynolds | C10G 45/64 208/111.3 |
| 4,302,323 | A | 11/1981 | Chen et al. | |
| 4,521,296 | A | 6/1985 | Kunihiro et al. | |
| 4,585,546 | A | 4/1986 | Bowes et al. | |
| 4,952,303 | A * | 8/1990 | Bortz | C10G 45/50 208/143 |
| 5,173,522 | A | 12/1992 | Kubo | |
| 5,840,175 | A | 11/1998 | Aldous et al. | |
| 5,846,405 | A * | 12/1998 | Aldous | C10G 67/0418 208/211 |
| 6,248,929 | B1 * | 6/2001 | Kaimai | B01D 17/042 585/241 |
| 8,585,889 | B2 | 11/2013 | Kim et al. | |
| 10,087,379 | B2 | 10/2018 | Patrick et al. | |
| 2004/0040888 | A1 | 3/2004 | Benazzi et al. | |
| 2004/0118745 | A1 | 6/2004 | Rettger et al. | |
| 2004/0222129 | A1 | 11/2004 | Aldous et al. | |
| 2005/0272850 | A1 * | 12/2005 | Jois | C08K 5/01 524/484 |
| 2006/0118464 | A1 | 6/2006 | Kaines | |
| 2008/0085970 | A1 * | 4/2008 | Suzuki | B60C 1/0008 524/476 |
| 2009/0020453 | A1 | 1/2009 | Tanaka et al. | |
| 2011/0005972 | A1 | 1/2011 | Kim et al. | |
| 2012/0205589 | A1 * | 8/2012 | Hansen | C10G 45/50 252/380 |
| 2013/0161237 | A1 | 6/2013 | Woo et al. | |
| 2013/0338256 | A1 | 12/2013 | Steiner et al. | |
| 2014/0262937 | A1 | 9/2014 | Kresnyak | |
| 2015/0057205 | A1 | 2/2015 | Morishima et al. | |
| 2018/0142165 | A1 | 5/2018 | Patrick et al. | |

FOREIGN PATENT DOCUMENTS

| | | | |
|---|---|---|---|
| CN | 101724448 | 6/2010 | |
| EP | 0462823 | 12/1991 | |
| EP | 1260569 A2 * | 11/2002 | ............ C10G 45/00 |
| EP | 2674454 | 1/2015 | |
| GB | 1161725 | 8/1969 | |
| WO | WO2011061716 | 5/2011 | |
| WO | WO2012156294 | 11/2012 | |
| WO | WO 2013176277 | 11/2013 | |

OTHER PUBLICATIONS

Written Opinion and International Search Report for International Application No. PCT/US2016/031.844 dated Sep. 5, 2016.
Application and File History for U.S. Appl. No. 15/572,701, filed Nov. 8, 2017 inventors Patrick et al.
Written Opinion and International Search Report for International Application No. PCT/US2016/03 1857 dated Aug. 31, 2016.
EPO Communication pursuant to Article 94(3) EPC for European Application No. 16724800.4 dated Aug. 16, 2019.
Russian Office Action and Search Report dated Oct. 9, 2019 for Russian Application No. 2017141613.
Russian Office Action dated Nov. 28, 2019 for Russian Application No. 2017141612.
Brazilian Communication for Brazilian Application No. BR1120170240165 dated Mar. 6, 2020.
Brazilian Communication for Brazilian Application No. BR112017024202 dated Mar. 31, 2020.
Chinese Office Action for Chinese Application No. 201680027509.2 dated May 6, 2020.
Chinese Office Action for Chinese Application No. 201680027508.5 dated May 6, 2020.

* cited by examiner

HIGH PERFORMANCE PROCESS OIL BASED ON DISTILLED AROMATIC EXTRACTS

CROSS REFERENCE TO RELATED APPLICATIONS

This application is a national stage filing under 35 U.S.C. § 371 of International Application No. PCT/US2016/031857 filed May 11, 2016 which claims priority under 35 U.S.C. § 119 to U.S. Provisional Application No. 62/160,089 filed May 12, 2015, the disclosures of both of which are incorporated herein by reference.

TECHNICAL FIELD

This invention relates to rubber process oils and their use.

BACKGROUND

Process oils are obtained in the refining of petroleum, and are used as plasticizers or extender oils in the manufacture of tires and other rubber products. Process oils may be classified based on their aromatic carbon content ($C_A$), naphthenic carbon content ($C_N$) and paraffinic carbon content ($C_P$), as measured for example according to ASTM D2140. Distillate Aromatic Extract (DAE) process oils contain considerable (e.g., about 35 to 50%) $C_A$ content, and have been used as process oils for truck tire tread compounds and other demanding rubber applications. However DAEs also contain benzo[a]pyrene and other polycyclic aromatic hydrocarbons (PAH compounds, also known as polycyclic aromatics or PCA) that may be classified as carcinogenic, mutagenic or toxic to reproduction. For example, European Council Directive 69/2005/EEC issued Nov. 16, 2005 prohibited the use after Jan. 1, 2010 of plasticizers with high PAH content.

High viscosity naphthenic oils have been used as DAE process oil substitutes. However, due to the generally lower $C_A$ content of naphthenic oils compared to that of DAEs, some rubber compound reformulation may be required to recover or maintain acceptable performance. Also, a variety of test criteria may need to be satisfied following reformulation. For tires, the test criteria may include wet grip (tan delta at 0° C.), rolling resistance (tan delta at 60° C.), skid resistance, dry traction, abrasion resistance and processability. This long list of potential test criteria has made it difficult to find suitable replacements for DAE process oils.

Accordingly, there remains an ongoing need for materials that can replace DAE process oils and thereby reduce or minimize PAH content, without unduly compromising the performance of rubber formulations employing such replacement materials compared to formulations employing a DAE process oil.

SUMMARY

The present invention provides, in one aspect, a method for making naphthenic process oils, the method comprising:
a) vacuum distilling residual bottoms from a naphthenic crude atmospheric distillation unit to provide one or more vacuum gas oils in one or more viscosity ranges;
b) blending at least one such vacuum gas oil with a high $C_A$ distilled aromatic extract feedstock to provide at least one blended oil; and
c) hydrotreating the at least one blended oil to provide an enhanced $C_A$ content naphthenic process oil;
wherein the feedstock and naphthenic process oil each have greater $C_A$ content than that of a comparison oil made by similarly hydrotreating the at least one such vacuum gas oil alone.

The present invention provides, in another aspect, a method for making naphthenic process oils, the method comprising:
a) atmospheric distilling naphthenic crude to provide one or more atmospheric gas oils in one or more viscosity ranges and residual bottoms;
b) vacuum distilling the residual bottoms to provide one or more vacuum gas oils in one or more additional viscosity ranges;
c) blending at least one such vacuum gas oil with a high $C_A$ distilled aromatic extract feedstock to provide at least one blended oil; and
d) hydrotreating the at least one blended oil to provide an enhanced $C_A$ content naphthenic process oil having greater $C_A$ content than that of the at least one such vacuum gas oil;
wherein the feedstock and naphthenic process oil each have greater $C_A$ content than that of a comparison oil made by similarly hydrotreating the at least one such vacuum gas oil alone.

In another embodiment the present invention provides a method for making naphthenic process oils, the method comprising:
a) blending residual bottoms from a naphthenic crude atmospheric distillation unit with a high $C_A$ distilled aromatic extract feedstock to provide a blended oil;
b) vacuum distilling the blended oil to provide one or more vacuum gas oils in one or more viscosity ranges; and
c) hydrotreating at least one of the vacuum gas oils to provide an enhanced $C_A$ content naphthenic process oil;
wherein the feedstock and naphthenic process oil each have greater $C_A$ content than that of a comparison oil made by similarly vacuum distilling and hydrotreating the residual, bottoms alone.

In a further embodiment the present invention provides a method for making naphthenic process oils, the method comprising:
a) blending naphthenic crude with a high $C_A$ distilled aromatic extract feedstock to provide a blended oil;
b) atmospheric distilling the blended oil to provide one or more atmospheric gas oils in one or more viscosity ranges and residual bottoms;
c) vacuum distilling the residual bottoms to provide one or more vacuum gas oils in one or more additional viscosity ranges; and
d) hydrotreating at least one of the vacuum gas oils to provide an enhanced $C_A$ content naphthenic process oil;
wherein the feedstock and naphthenic process oil each have greater $C_A$ content than that of a comparison oil made by similarly atmospheric distilling, vacuum distilling and hydrotreating the naphthenic crude alone.

The present invention provides, in yet another aspect, a method for making naphthenic process oils, the method comprising:
a) blending a naphthenic vacuum gas oil having a viscosity of at least 60 SUS at 38° C. (100° F.) with a high $C_A$ distilled aromatic extract feedstock to provide a blended oil; and
b) hydrotreating the blended oil to provide an enhanced $C_A$ content naphthenic process oil;

wherein the feedstock and naphthenic process oil each have greater $C_A$ content than that of a comparison oil made by similarly hydrotreating the naphthenic vacuum gas oil alone.

The present invention also provides a naphthenic process oil comprising a hydrotreated blend of a) at least one naphthenic vacuum gas oil having a viscosity of at least 60 SUS at 38° C. (100° F.) and b) a high $C_A$ distilled aromatic extract feedstock having greater $C_A$ content than that of a comparison oil made by similarly hydrotreating the at least one naphthenic vacuum gas oil alone.

DAEs for use in the above method may be obtained from a solvent extraction unit that extracts an aromatic fraction from a crude distillate, typically a paraffinic crude distillate. The enhanced $C_A$ content naphthenic process oils obtained from the above methods have increased aromatic content and improved solvency in rubber compounds compared to conventional naphthenic process oils, and may be used to replace conventional DAE process oils.

A DAE may be hydrotreated by itself to produce an improved process oil, but doing so on a commercial scale can be difficult due to the large exotherm that may occur during the hydrotreating reaction. Use of the disclosed blended oil enables the naphthenic vacuum gas oil to serve as a heat sink that moderates the heat of the DAE hydrotreating reaction, thereby facilitating improved hydrotreating reaction control with reduced likelihood that an uncontrollable exotherm might occur. The blended oil can be prepared using relatively low DAE amounts.

BRIEF DESCRIPTION OF THE DRAWING

Like reference symbols in the various figures of the drawing indicate like elements.

DETAILED DESCRIPTION

Numerical ranges expressed using endpoints include all numbers subsumed within that range (e.g., 1 to 5 includes 1, 1.5, 2, 2.75, 3, 3.80, 4 and 5). All percentages are weight percentages unless otherwise stated.

The term "8-markers" when used with respect to a feedstock, process stream or product refers to the total quantity of the polycyclic aromatic hydrocarbons benzo(a)pyrene (BaP, CAS No. 50-32-8), benzo(e)pyrene (BeP, CAS No. 192-97-2), benzo(a)anthracene (BaA, CAS No. 56-55-3), chrysene (CHR, CAS No. 218-01-9), benzo(b)fluoranthene (BbFA, CAS No. 205-99-2), benzo(j)fluoranthene (BjFA, CAS No. 205-82-3), benzo(k)fluoranthene (BkFA, CAS No. 207-08-9) and dibenzo(a,h)anthracene (DBAhA, CAS No. 53-70-3) in such feedstock, process stream or product. Limits for these aromatics are set forth in European Union Directive 2005/69/EC of the European Parliament and of the Council of 16 Nov. 2005, at 10 ppm for the sum of the 8-markers, and 1 ppm for benzo[a]pyrene. PAH 8-marker levels may also be evaluated using gas chromatography/mass spectrometry (GC/MS) procedures to provide results that will be similar to those obtained using European standard EN 16143:2013.

The term "high $C_A$ distilled aromatic extract feedstock" when used with respect to a feedstock, process stream, or product refers to a liquid material having a viscosity-gravity constant (VGC) close to 1 (e.g., greater than about 0.95) as determined by ASTM D2501. Aromatic feedstocks or process streams typically will contain at least about 10% $C_A$ content and less than about 90% total $C_P$ plus $C_N$ content as measured according to ASTM D2140 or D3238, with the latter method typically being used for heavier petroleum fractions.

The term "ASTM" refers to the American Society for Testing and Materials which develops and publishes international and voluntary consensus standards. Exemplary ASTM test methods are set out below. However, persons having ordinary skill in the art will recognize that standards from other internationally recognized organizations will also be acceptable and may be used in place of or in addition to ASTM standards.

The term "enhanced $C_A$ content napthenic process oil" refers to an oil having a greater $C_A$ content than that of a comparison oil made by similarly hydrotreating at least one naphthenic vacuum gas oil alone without using the method of this disclosure.

The term "hydrocracking" refers to a process in which a feedstock or process stream is reacted with hydrogen in the presence of a catalyst at very high temperatures and pressures, so as to crack and saturate the majority of the aromatic hydrocarbons present and eliminate all or nearly all sulfur-, nitrogen- and oxygen-containing compounds.

The term "hydrofinishing" refers to a process in which a feedstock or process stream is reacted with hydrogen in the presence of a catalyst under less severe conditions than for hydrotreating or hydrocracking, so as to saturate olefins and to some extent aromatic rings, and thus reduce the levels of PAH compounds and stabilize (e.g., reduce the levels of) otherwise unstable molecules. Hydrofinishing may for example be used following hydrocracking to improve the color stability and stability towards oxidation of a hydrocracked product.

The term "hydrogenated" when used with respect to a feedstock, process stream or product refers to a material that has been hydrofinished, hydrotreated, reacted with hydrogen in the presence of a catalyst or otherwise subjected to a treatment process that materially increases the bound hydrogen content of the feedstock, process stream or product.

The term "hydrotreating" refers to a process in which a feedstock or process stream is reacted with hydrogen in the presence of a catalyst under more severe conditions than for hydrofinishing and under less severe conditions than for hydrocracking, so as to reduce unsaturation (e.g., aromatics) and reduce the amounts of sulfur-, nitrogen- or oxygen-containing compounds.

The term "liquid yield" when used with respect to a process stream or product refers to the weight percent of liquid products collected based on the starting liquid material amount.

The term "naphthenic" when used with respect to a feedstock, process stream or product refers to a liquid material having a VGC from about 0.85 to about 0.95 as determined by ASTM D2501. Naphthenic feedstocks typically will contain at least about 30% $C_N$ content and less than about 70% total $C_P$ plus $C_A$ content as measured according to ASTM D2140.

The term "naphthenic blend stock" refers to a naphthenic crude residual bottom, naphthenic crude, naphthenic vacuum gas oil or naphthenic atmospheric gas oil for use in the disclosed method, viz., for use in blending with a disclosed feedstock.

The term "paraffinic" when used with respect to a feedstock, process stream or product refers to a liquid material having a VGC near 0.8 (e.g., less than 0.85) as determined by ASTM D2501. Paraffinic feedstocks typically will contain at least about 60 wt. % $C_P$ content and less than about 40 wt. % total $C_N+C_A$ content as measured according to ASTM D2140.

The terms "Viscosity-Gravity Constant" or "VGC" refer to an index for the approximate characterization of the viscous fractions of petroleum. VGC formerly was defined as the general relation between specific gravity and Saybolt Universal viscosity. VGC may be determined based on density and viscosity measurements according to ASTM D2501. VGC is relatively insensitive to molecular weight.

The term "viscosity" when used with respect to a feedstock, process stream or product refers to the kinematic viscosity of a liquid. Kinematic viscosities typically are expressed in units of $mm^2/s$ or centistokes (cSt), and may be determined according to ASTM D445. Historically the petroleum industry has measured kinematic viscosities in units of Saybolt Universal Seconds (SUS). Viscosities at different temperatures may be calculated according to ASTM D341 and converted from cSt to SUS according to ASTM D2161.

Figure 1:
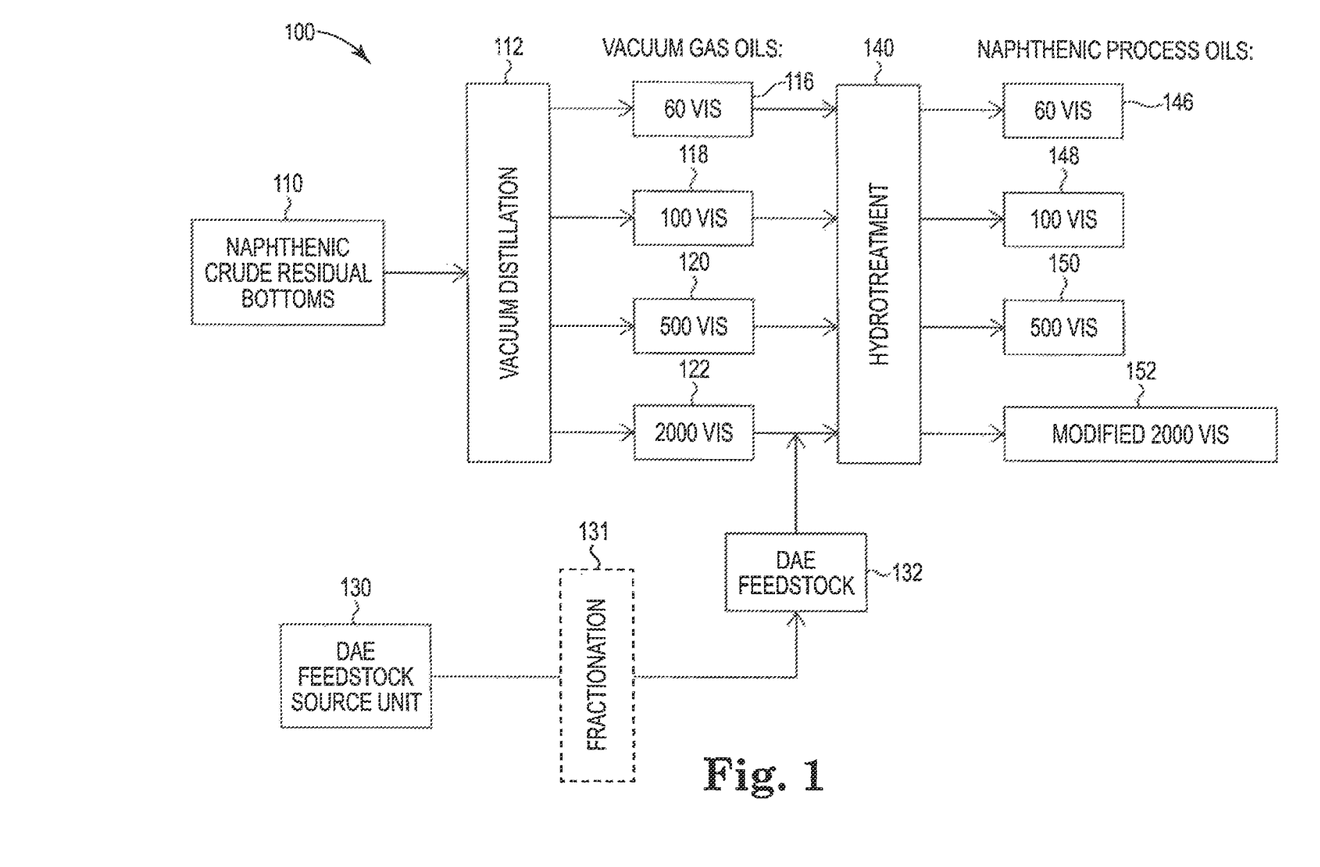
FIG. 1 through FIG. 5 are schematic diagrams illustrating the disclosed method.

Several embodiments of the disclosed method are schematically illustrated in FIG. 1 through FIG. 5. Referring to FIG. 1, a method for modifying naphthenic crude residual bottoms to provide a modified naphthenic process oil is shown. Steps 100 include vacuum distilling naphthenic crude residual bottoms 110 in vacuum distillation unit 112 to provide a naphthenic blend stock in the form of one or more vacuum gas oils 116, 118, 120 and 122 with respective nominal viscosities of approximately 60, 100, 500 and 2000 SUS at 38° C. (100° F.). A supply of DAE feedstock from source unit 130 may be subjected to an optional fractionation step 131 to isolate from the DAE feedstock a fraction that distills in the same general ranges as oil or oils present in the naphthenic blend stock. Source unit 130 may for example be a solvent extraction unit. DAE feedstock 132 from source unit 130 or fractionating or extraction step 131 is provided to a blending unit (not shown in FIG. 1) where at least vacuum gas oil 122 and DAE feedstock 132 are blended together. In a typical distillation situation, vacuum gas oil 122 may be the highest viscosity vacuum gas oil obtained from vacuum distillation unit 112. DAE feedstock 132 may if desired also or instead be blended with some or all of the remaining lower viscosity vacuum gas oils obtained from unit 112, e.g., with one or more of the 60, 100 or 500 SUS vacuum gas oils 116, 118 or 120. Blending can be carried out using a variety of devices and procedures including mixing valves, static mixers, mixing tanks and other techniques that will be familiar to persons having skill in the art.

Hydrotreatment unit 140 is employed to hydrotreat at least the above-mentioned blend of vacuum gas oil 122 and DAE feedstock 132, and desirably also to hydrotreat some or all of the remaining lower viscosity vacuum gas oils obtained from unit 112, or to hydrotreat blends of such lower viscosity vacuum gas oils with DAE feedstock 132. The resulting naphthenic process oils 146, 148, 150 and 152 have respective nominal viscosities of approximately 60, 100, 500 and 2000 SUS at 38° C. (100° F.), and if hydrotreated also have reduced unsaturation and reduced amounts of sulfur-, nitrogen- or oxygen-containing compounds. The resulting modified oils (for example, 500 SUS or 2000 SUS viscosity naphthenic process oil 152) may be used as a replacement for DAE process oils.

Figure 2:
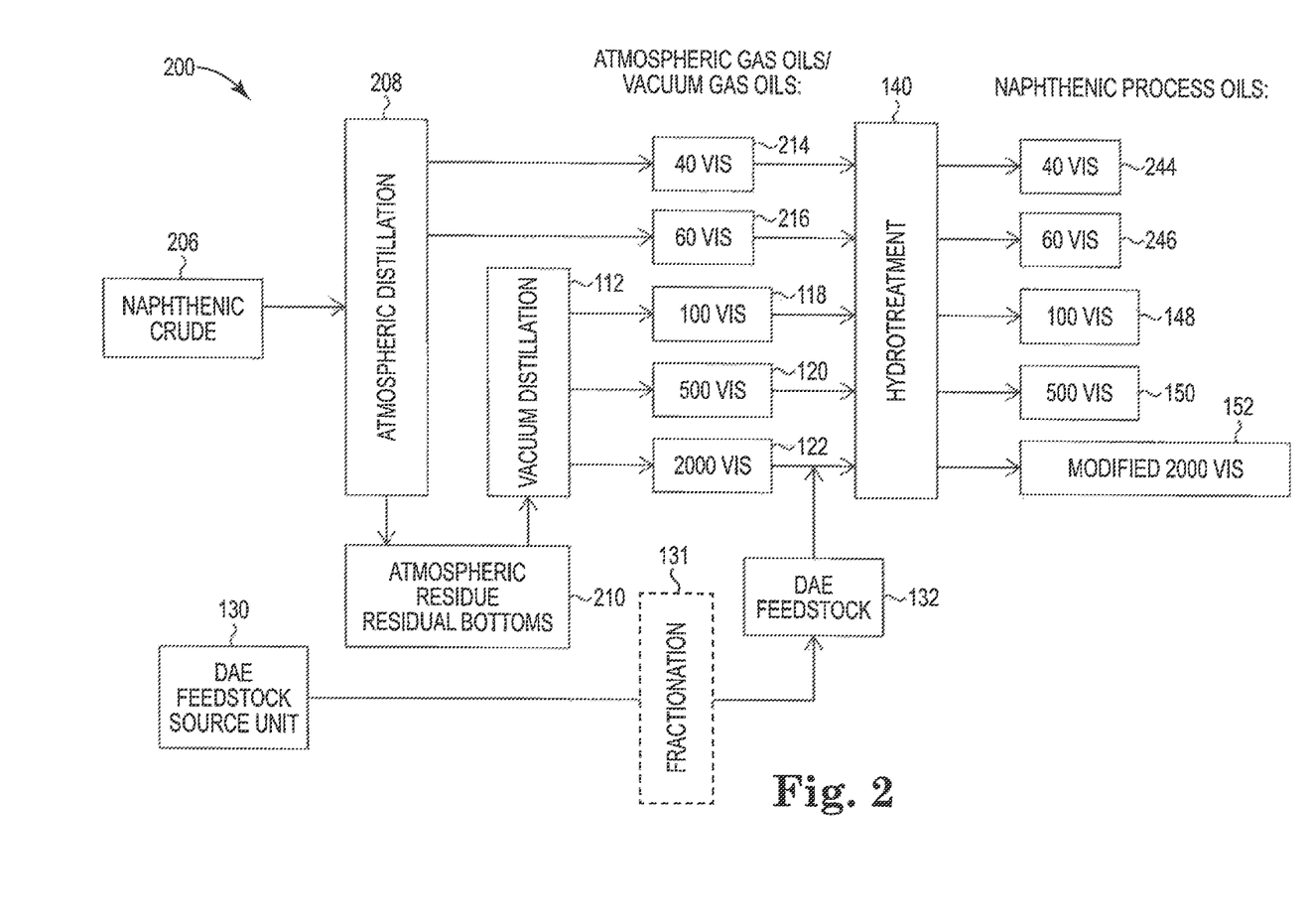

Referring to FIG. 2, a method for modifying naphthenic crude to provide a modified naphthenic process oil is shown. DAE feedstock source unit 130, optional fractionation step 131, DAE feedstock 132 and hydrotreatment unit 140 are as described in FIG. 1. Steps 200 include atmospherically distilling naphthenic crude 206 in atmospheric distillation unit 208 to provide atmospheric gas oils 214 and 216 with respective nominal viscosities of approximately 40 and 60 SUS at 38° C. (100° F.) and atmospheric residue residual bottoms 210. Residual bottoms 210 are vacuum distilled in vacuum distillation unit 112 to provide vacuum gas oils 118, 120 and 122 with respective nominal viscosities of approximately 100, 500 and 2000 SUS at 38° C. (100° F.). Through adjustment of the conditions in vacuum distillation unit 112, lower viscosity vacuum gas oils, e.g., oils with a viscosity of approximately 60 SUS at 38° C. (100° F.), may be obtained from unit 112 if desired. DAE feedstock 132 is provided to a blending unit (not shown in FIG. 2) where at least vacuum gas oil 122 and DAE feedstock 132 are blended together. DAE feedstock 132 may if desired also or instead be blended with some or all of the remaining lower viscosity vacuum gas oils obtained from unit 112, e.g., with either or both the 100 or 500 SUS vacuum gas oils 118 or 120. Unit 140 is employed to hydrotreat at least the above-mentioned blend of vacuum gas oil 122 and DAE feedstock 132, any additional blends containing a lower viscosity vacuum gas oil and $C_A$ feedstock 132, and desirably also some or all of the remaining lower viscosity vacuum gas oils obtained from unit 112 or the atmospheric gas oils obtained from unit 208. The resulting naphthenic process oils 244, 246, 148, 150 and 152 have respective nominal viscosities of approximately 40, 60, 100, 500 and 2000 SUS at 38° C. (100° F.), and if hydrotreated also have reduced unsaturation and reduced amounts of sulfur-, nitrogen- or oxygen-containing compounds. Modified oils such as 500 SUS or 2000 SUS viscosity naphthenic process oil 152 may be used as a replacement for DAE process oils.

Figure 3:
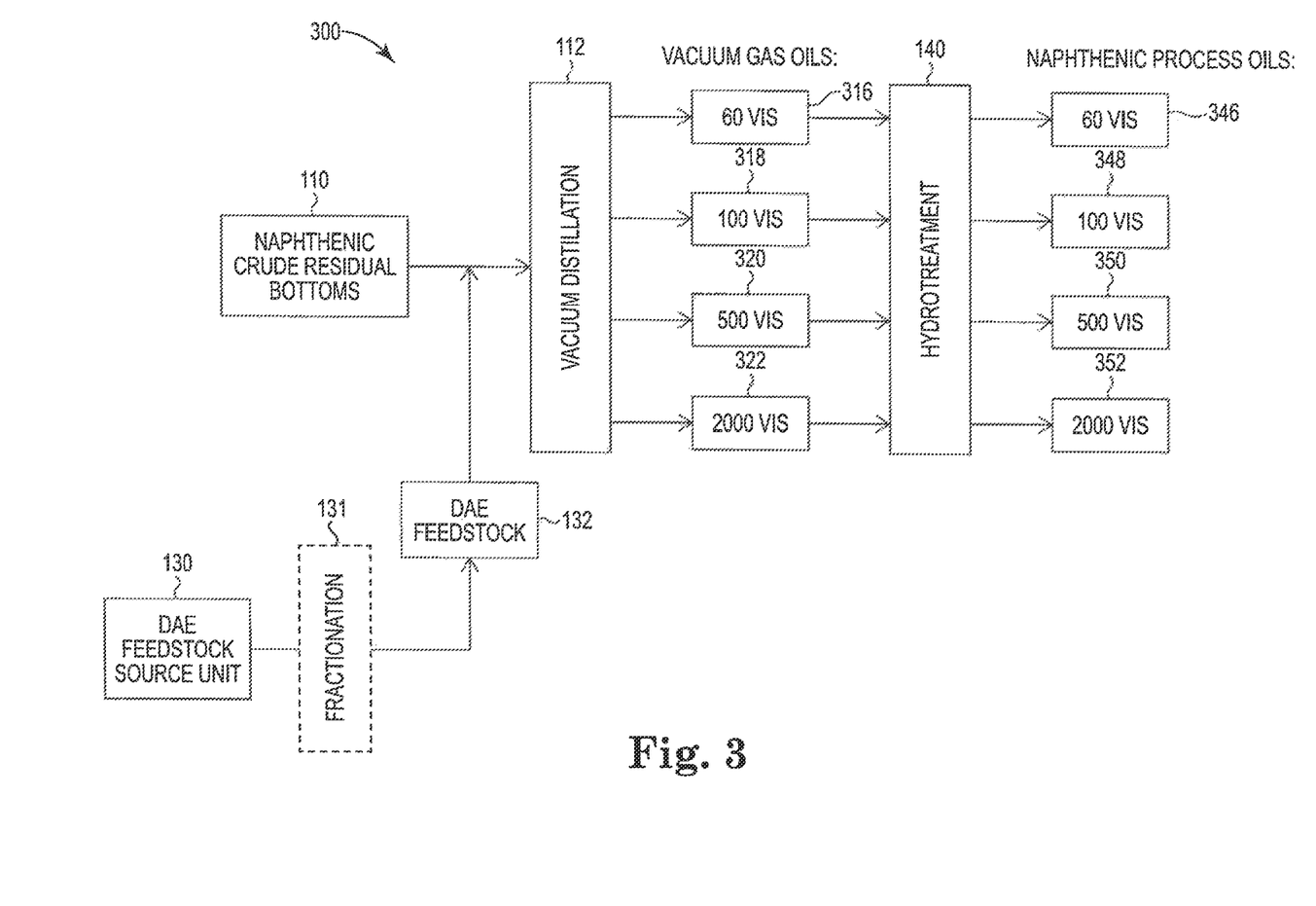

Referring to FIG. 3, another method for modifying naphthenic crude residual bottoms to provide a modified naphthenic process oil is shown. FIG. 3 is like FIG. 1, but residual bottoms 110 are blended with feedstock 132 and the blend subjected to vacuum distillation, rather than waiting until after the vacuum distillation step to carry out feedstock blending. DAE feedstock source unit 130, optional fractionation or extraction step 131, DAE feedstock 132 and hydrotreatment unit 140 are as described in FIG. 1. Steps 300 include blending naphthenic crude residual bottoms 110 with DAE feedstock 132 obtained from DAE feedstock source unit 130 or from fractionating step 131. Blending can be performed using a blending unit (not shown in FIG. 3) and procedures that will be familiar to persons having skill in the art. The blend is then vacuum distilled in vacuum distillation unit 112 to provide vacuum gas oils 316, 318, 320 and 322 with respective nominal viscosities of approximately 60, 100, 500 and 2000 SUS at 38° C. (100° F.). Unit 140 is employed to hydrotreat at least vacuum gas oil 322, and desirably also to hydrotreat some or all of the remaining lower viscosity vacuum gas oils obtained from unit 112, or to hydrotreat blends of such lower viscosity vacuum gas oils with DAE feedstock 132. The resulting naphthenic process oils 346, 348, 350 and 352 have respective nominal viscosities of approximately 60, 100, 500 and 2000 SUS at 38° C. (100° F.). When using the method shown in FIG. 3, the DAE feedstock can potentially affect the characteristics of all of the naphthenic process oils made using the method, rather than merely affecting those with which the feedstock has been blended. A distillation curve for the DAE feedstock when distilled by itself can be used to estimate the extent to which the feedstock will influence the characteristics of lower viscosity oils, with low boiling feedstocks having a greater tendency to influence the characteristics of low viscosity oils than will be the case for high boiling feedstocks. The hydrotreated oils obtained from unit 140 will have reduced unsaturation and reduced amounts of sulfur-, nitrogen- or oxygen-containing compounds. Modified oils such as 500 SUS or 2000 SUS viscosity naphthenic process oil 352 may be used as a replacement for DAE process oils.

Figure 4:
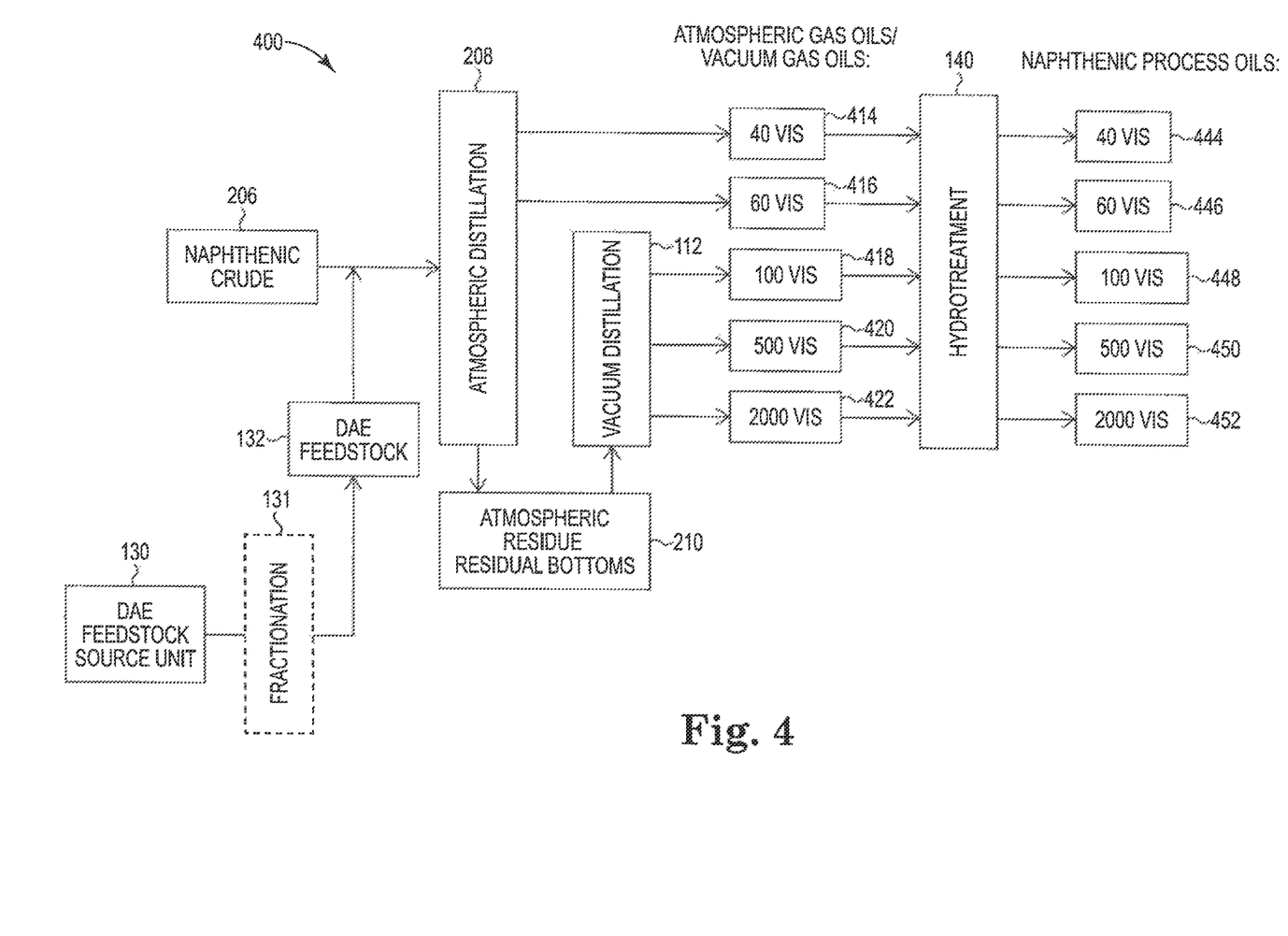

Referring to FIG. 4, another method for modifying naphthenic crude to provide a modified naphthenic process oil is shown. FIG. 4 is like FIG. 2, but naphthenic crude 206 is blended with DAE feedstock 132 and the blend subjected to atmospheric and vacuum distillation, rather than waiting until later to carry out feedstock blending. DAE feedstock source unit 130, optional fractionation step 131, DAE feedstock 132, hydrotreatment unit 140 and atmospheric distillation unit 208 are as described in FIG. 2. Steps 400 include blending naphthenic crude 206 with DAE feedstock 132 obtained from DAE feedstock source unit 130 or from fractionating step 131. Blending can be performed using a blending unit (not shown in FIG. 4) and procedures that will be familiar to persons having skill in the art. The blend is then atmospherically distilled in atmospheric distillation unit 208 to provide atmospheric gas oils 414 and 416 with respective nominal viscosities of approximately 40 and 60 SUS at 38° C. (100° F.) and atmospheric residual bottoms 210. Residual bottoms 210 are vacuum distilled in vacuum distillation unit 112 to provide vacuum gas oils 418, 420 and 422 with respective nominal viscosities of approximately 100, 500 and 2000 SUS at 38° C. (100° F.). Unit 140 is employed to hydrotreat at least vacuum gas oil 422, and desirably also to hydrotreat some or all of the remaining lower viscosity vacuum gas oils or blends obtained from unit 112 or some or all of the atmospheric gas oils obtained from unit 208. The resulting naphthenic process oils 444, 446, 448, 450 and 452 have respective nominal viscosities of approximately 40, 60, 100, 500 and 2000 SUS at 38° C. (100° F.), and if hydrotreated also have reduced unsaturation and reduced amounts of sulfur-, nitrogen- or oxygen-containing compounds. Modified oils such as 500 SUS or 2000 SUS viscosity naphthenic process oil 452 may be used as a replacement for DAE process oils.

Figure 5:
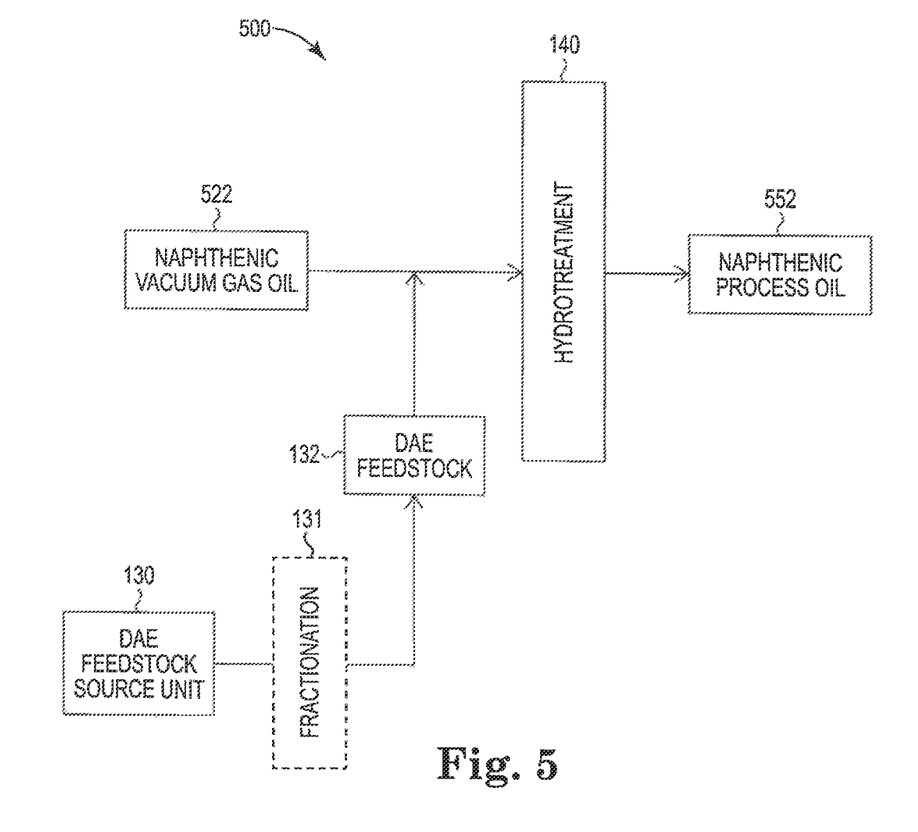

Referring to FIG. 5, another method for making a modified naphthenic process oil is shown. DAE feedstock source unit 130, optional fractionation step 131, DAE feedstock 132 and hydrotreatment unit 140 are as described in FIG. 1. Steps 500 include blending naphthenic vacuum gas oil 522 with DAE feedstock 132 obtained from DAE feedstock source unit 130 or from fractionating step 131. Vacuum gas oil 522 has a minimum viscosity of at least 60 SUS and preferably 500 SUS or 2000 SUS at 38° C. (100° F.). Blending can be performed using a blending unit (not shown in FIG. 5) and procedures that will be familiar to persons having skill in the art. The blend is then hydrotreated in unit 140 to provide naphthenic process oil 552 which may be used as a replacement for DAE process oils.

Additional processing steps may optionally be employed before or after the steps mentioned above. Exemplary such steps include solvent extraction, catalytic dewaxing, solvent dewaxing, hydrofinishing and hydrocracking. In some embodiments no additional processing steps are employed, and in other embodiments additional processing steps such as any or all of deasphalting, solvent extraction, catalytic dewaxing, solvent dewaxing, hydrofinishing and hydrocracking are not required or are not employed.

A variety of naphthenic crude residual bottoms and naphthenic crudes may be employed as naphthenic blend stocks in the disclosed method. When naphthenic crude residual bottoms are employed, they typically will be obtained from an atmospheric distillation unit for naphthenic crudes operated in accordance with procedures that will be familiar to persons having ordinary skill in the art, and normally will have a boiling point above about 370 to 380° C. When naphthenic crudes are employed in the disclosed method, they may be obtained from a variety of sources. Exemplary naphthenic crudes include Brazilian, North Sea, West African, Australian, Canadian and Venezuelan naphthenic crudes from petroleum suppliers including BHP Billiton Ltd., BP p.l.c., Chevron Corp., ExxonMobil Corp., Mitsui & Co., Ltd., Royal Dutch Shell p.l.c., Petrobras, Total S.A., Woodside Petroleum Ltd. and other suppliers that will be familiar to persons having ordinary skill in the art. The chosen naphthenic crude may for example have a VGC of at least about 0.85, 0.855, 0.86 or 0.865, and a VGC less than about 1, 0.95. 0.9 or 0.895, as determined by ASTM D2501. Preferred naphthenic crudes will provide a vacuum gas oil having a VGC from about 0.855 to 0.895. The chosen crude may also contain at least about 30%, at least about 35% or at least about 40% $C_N$ content, and less than about 70%, less than about 65% or less than about 60 total $C_P$ plus $C_A$ content as measured according to ASTM D2140.

A variety of naphthenic vacuum gas oils may be used as naphthenic blend stocks in the disclosed method. The vacuum gas oil may be used in a non-hydrotreated form, blended with the chosen feedstock, and then the resulting blended liquid may be hydrotreated. Alternatively, a hydrotreated naphthenic vacuum gas oil may be employed as the naphthenic blend stock, blended with the chosen feedstock, and then the resulting blended liquid may be further hydrotreated. Before it is hydrotreated, the chosen naphthenic vacuum gas oil may for example contain at least about 10%, at least about 12%, at least about 14%, at least about 16% or at least about 18% $C_A$ content, and may also or instead contain less than about 24%, less than about 22%, less than about 21% or less than about 20% $C_A$ content. Before hydrotreating, the chosen naphthenic vacuum gas oil may for example also or instead contain at least about 40% or at least about 45% $C_A$ plus $C_N$ content.

Preferred hydrotreated naphthenic 60 SUS vacuum gas oils may for example have the following desirable characteristics separately or in combination: an aniline point (ASTM D611) of about 64° C. to about 85° C. or about 72° C. to about 77° C.; a flash point (Cleveland Open Cup, ASTM D92) of at least about 80° C. to about 230° C., or of at least about 136° C. to about 176° C.; a viscosity (SUS at 37.8° C.) of about 35 to about 85 or about 54 to about 72; a pour point (° C., ASTM D5949) of about −90° C. to about −20° C. or about −75° C. to about −35° C.; and yields that are greater than 85 vol. %, e.g., greater than about 90%, greater than about 97%, or about 97% to about 99% of total lube yield based on feedstock.

Preferred hydrotreated naphthenic 100 SUS vacuum gas oils may for example have the following desirable characteristics separately or in combination: an aniline point (ASTM D611) of about 64° C. to about 85° C. or about 72° C. to about 77° C.; a flash point (Cleveland Open Cup, ASTM D92) of at least about 90° C. to about 260° C., or of at least about 154° C. to about 196° C.; a viscosity (SUS at 37.8° C.) of about 85 to about 135 or about 102 to about 113; a pour point (° C., ASTM D5949) of about −90° C. to about −12° C. or about −70° C. to about −30° C.; and yields that are greater than 85 vol. %, e.g., greater than about 90%, greater than about 97%, or about 97% to about 99% of total lube yield based on feedstock.

Preferred hydrotreated naphthenic 500 SUS vacuum gas oils may for example have the following desirable characteristics separately or in combination: an aniline point (ASTM D611) of about 77° C. to about 98° C. or about 82° C. to about 92° C.; a flash point (Cleveland Open Cup, ASTM D92) of at least about 111° C. to about 333° C., or of at least about 167° C. to about 278° C.; a viscosity (SUS at 37.8° C.) of about 450 to about 600 or about 500 to about 550; a pour point (° C., ASTM D5949) of about −73° C. to about −17° C. or about −51° C. to about −6° C.; and yields that are greater than 85 vol. %, e.g., greater than about 90%, greater than about 97%, or about 97% to about 99%, of total lube yield based on feedstock.

Preferred hydrotreated naphthenic 2000 vacuum gas oils may for example have the following desirable characteristics separately or in combination: an aniline point (ASTM D611) of about 90° C. to about 110° C. or about 93° C. to about 103° C.; a flash point (Cleveland Open Cup, ASTM D92) of at least about 168° C. to about 363° C., or of at least about 217° C. to about 314° C.; a viscosity (SUS at 37.8° C.) of about 1700 to about 2500 or about 1900 to about 2300; a pour point (° C., ASTM D5949) of about −53° C. to about 24° C. or about −33° C. to about 6° C.; and yields that are greater than 85 vol. %, e.g., greater than about 90%, greater than about 97%, or about 97% to about 99%, of total lube yield based on feedstock.

Other desirable characteristics for the disclosed hydrotreated naphthenic vacuum gas oils may include compliance with environmental standards such as EU Directive 2005/69/EC, IP346 and Modified AMES testing ASTM E1687, to evaluate whether the finished product may be carcinogenic. These tests correlate with the concentration of polycyclic aromatic hydrocarbons. Desirably, the disclosed hydrotreated naphthenic vacuum gas oils have less than about 8 ppm, more desirably less than about 2 ppm and most desirably less than about 1 ppm of the sum of the 8-markers when evaluated according to European standard EN 16143: 2013. The latter values represent especially noteworthy 8-markers scores, and represent up to an order of magnitude improvement beyond the EU regulatory requirement.

Exemplary commercially available naphthenic vacuum gas oils, some of which may already have been hydrotreated, include HYDROCAL™, HYDROSOL™ and HR TUF-FLO™ oils from Calumet Specialty Products Partners, LP; CORSOL™ RPO, CORSOL 1200, CORSOL 2000 and CORSOL 2400 oils from Cross Oil and Refining Co., Inc.; HYPRENE™ L2000 oil from Ergon, Inc; NYTEX™ 230, NYTEX 810, NYTEX 820, NYTEX 832, NYTEX 840, NYTEX 8150, NYFLEX™ 220, NYFLEX 223, NYFLEX 820 and NYFLEX 3100 oils from Nynas AB; and RAFFENE™ 1200L, RAFFENE 2000L, HYNAP™ 500, HYNAP 2000 and HYNAP 4000 oils from San Joaquin Refining Co., Inc.

The above-mentioned HYPRENE L2000 oil is a severely hydrotreated base oil having the following typical test values:

TABLE 1

HYPRENE L2000 Properties

| Test description | Test Method | Test Value |
| --- | --- | --- |
| API Gravity | ASTM D1250 | 21.8 |
| Sp. gr. @ 15.6/15.6° C. (60/60° F.) | ASTM D1298 | 0.9230 |
| Sulfur, wt % | ASTM D4294 | 0.085 |
| Aniline Pt., ° C. | ASTM D611 | 98 |
| Flash point, COC, ° C. | ASTM D92 | 266 |
| UV Absorp. @ 260 nm | ASTM D2008 | 5.8 |
| Refractive Index @ 20° C. | ASTM D1218 | 1.5080 |

TABLE 1-continued

HYPRENE L2000 Properties

| Test description | Test Method | Test Value |
| --- | --- | --- |
| Viscosity, cSt @38° C. (100° F.) | ASTM D445 | 383 |
| Viscosity, cSt.@99° C. (210° F.) | ASTM D445 | 20 |
| Viscosity, SUS@38° C. (100° F.) | ASTM D445 | 2093 |
| Viscosity, SUS@99° C. (210° F.) | ASTM D445 | 101 |
| Color, ASTM | ASTM D6045 | L2.5 |
| Pour Point, ° C. | ASTM D5949 | −14 |
| VGC | ASTM D2501 | 0.850 |
| Clay Gel, wt. %: | ASTM D2007 | |
| Asphaltenes | | <0.1 |
| Saturates | | 57.2 |
| Polars | | 2.8 |
| Aromatics | | 40.0 |
| Carbon Analysis | ASTM D2140 | |
| $C_A$, % | | 13 |
| $C_N$, % | | 32 |
| $C_P$, % | | 55 |
| Tg, ° C. | ASTM D3418 | −54 |
| PCA Extract | IP 356 | <3 |

Another exemplary hydrotreated naphthenic vacuum gas oil for use in the disclosed method is available as TUF-FLO™ 2000 from Calumet Specialty Products Partners, LP with the following typical test values:

TABLE 2

TUFFLO 2000 Properties

| Test description | Test Method | Test Value |
| --- | --- | --- |
| Density @ 15° C., kg/m³ | ASTM D4052 | 925 |
| Aniline Pt., ° C. | ASTM D611 | 97 |
| Viscosity, SUS@38° C. | ASTM D445 | 2092 |
| Viscosity, SUS@99° C. | ASTM D445 | 96 |
| VGC | ASTM D2501 | 0.849 |
| Clay Gel, wt. %: | ASTM D2007 | |
| Asphaltenes | | 0 |
| Saturates | | 60 |
| Polars | | 2 |
| Aromatics | | 38 |
| Carbon Analysis | ASTM D2140 | |
| $C_A$, % | | 13 |
| $C_N$, % | | 37 |
| $C_P$, % | | 50 |
| Tg, ° C. | ASTM D3418 | −54 |

The above-mentioned HYPRENE L2000 and TUFFLO 2000 oils may be used as is in process oil applications. However, the disclosed method may be used to improve such oils further by for example increasing their $C_A$ content and improving their solubility in rubber formulations.

The vacuum distillation unit (and if used, the atmospheric distillation unit) may be operated in accordance with standard industry practices that will be familiar to persons having ordinary skill in the art. Vacuum gas oils and atmospheric gas oils having desired viscosity ranges can be obtained from such distillation units. Exemplary viscosity ranges include oils having a viscosity from about 60 to about 3,500, about 500 to about 3,000 or about 1,000 to about 2,500 SUS at 38° C., and properties like or unlike (e.g., between) those listed above for naphthenic 60 and naphthenic 2000 vacuum gas oils.

DAEs for use in the disclosed method typically will be obtained from a solvent extraction unit that extracts an aromatic fraction from a crude distillate, typically a paraffinic crude distillate, and operated in accordance with procedures that will be familiar to persons having ordinary skill in the art. Exemplary DAEs will be extracts produced from a Group I solvent extraction process, and may be produced by companies including BP p.l.c., Chevron Corp., ExxonMobil Corp., HollyFrontier Corp., PBF Energy, Inc. and Royal Dutch Shell p.l.c. The chosen DAE may for example contain at least about 20%, at least about 25% or at least about 30% CA content, and may be as high as 65% or more $C_A$ content. As a generalization, addition of the DAE feedstock may increase $C_A$, reduce the aniline point, increase UV absorption and refractive index, increase the VGC value compared to the starting naphthenic blend stock or vacuum gas oil, and increase the solvency of the process oil in rubber compounds. Use of a DAE feedstock may also increase $C_N$ while reducing $C_P$, due for example to conversion of $C_A$ from the feedstock to saturated naphthenes ($C_N$) during the hydrotreating step. Increasing the $C_N$ content may also increase solvency of the process oil in rubber compounds, although to a lesser degree than may be observed for increased $C_A$ content.

The naphthenic blend stock and DAE feedstock may be mixed in any convenient fashion, for example by adding the DAE feedstock to the naphthenic blend stock or vice-versa. The naphthenic blend stock and DAE feedstock may be mixed in a variety of ratios. The chosen mixing ratio can readily be selected by persons skilled in the art, and may depend in part on the chosen materials and their viscosities, $C_A$ contents and PAH 8-marker values. Preferably the resulting blended liquid will contain at least about 2, at least about 5 or at least about 10 wt. % DAE feedstock based on the weight of the blended liquid. Also, the blended liquid preferably will contain up to about 40, up to about 20 or up to about 15 wt. % DAE feedstock based on the weight of the blended liquid. Extenders and rubber additives that will be familiar to those skilled in the art may also be added to the blended liquid if desired.

The blended liquid is hydrotreated. The primary purpose of hydrotreating is to remove sulfur, nitrogen and polar compounds and to saturate some aromatic compounds. The hydrotreating step thus produces a first stage effluent or hydrotreated effluent having at least a portion of the aromatics present in the blended liquid saturated, and the concentration of sulfur- or nitrogen-containing heteroatom compounds decreased. The hydrotreating step may be carried out by contacting the blended liquid with a hydrotreating catalyst in the presence of hydrogen under suitable hydrotreating conditions, using any suitable reactor configuration. Exemplary reactor configurations include a fixed catalyst bed, fluidized catalyst bed, moving bed, slurry bed, counter current, and transfer flow catalyst bed.

The hydrotreating catalyst is used in the hydrotreating step to remove sulfur and nitrogen and typically includes a hydrogenation metal on a suitable catalyst support. The hydrogenation metal may include at least one metal selected from Group 6 and Groups 8-10 of the Periodic Table (based on the IUPAC Periodic Table format having Groups from 1 to 18). The metal will generally be present in the catalyst composition in the form of an oxide or sulfide. Exemplary metals include iron, cobalt, nickel, tungsten, molybdenum, chromium and platinum. Particularly desirable metals are cobalt, nickel, molybdenum and tungsten. The support may be a refractory metal oxide, for example, alumina, silica or silica-alumina. Exemplary commercially available hydrotreating catalysts include LH-23, DN-200, DN-3330, and DN-3620/3621 from Criterion. Companies such as Albemarle, Axens, Haldor Topsoe, and Advanced Refining Technologies also market suitable catalysts.

The temperature in the hydrotreating step typically may be about 260° C. (500° F.) to about 399° C. (750° F.), about 287° C. (550° F.) to about 385° C. (725° F.), or about 307° C. (585° F.) to about 351° C. (665° F.). Exemplary hydrogen pressures that may be used in the hydrotreating stage typically may be about 5,515 kPa (800 psig) to about 27,579 kPa (4,000 psig), about 8,273 kPa (1,200 psig) to about 22,063 kPa (3,200 psig), or about 11,721 kPa (1700 psig) to about 20,684 kPa (3,000 psig). The quantity of hydrogen used to contact the feedstock may typically be about 17.8 to about 1,780 $m^3/m^3$ (about 100 to about 10,000 standard cubic feet per barrel (scf/B)) of the feedstock stream, about 53.4 to about 890.5 $m^3/m^3$ (about 300 to about 5,000 scf/B) or about 89.1 to about 623.4 $m^3/m^3$ (500 to about 3,500 scf/B). Exemplary reaction times between the hydrotreating catalyst and the feedstock may be chosen so as to provide a liquid hourly space velocity (LHSV) of about 0.25 to about 5 cc of oil per cc of catalyst per hour ($hr^{-1}$), about 0.35 to about 1.5 $hr^{-1}$, or about 0.5 to about 0.75 $hr^{-1}$.

The resulting modified naphthenic process oil may for example have the following desirable characteristics separately or in combination: a flash point (Cleveland Open Cup, ASTM D92) of at least about 240° C.; a boiling point (corrected to atmospheric pressure) of about 320° to about 650° C. or about 3500 to about 600° C.; a kinematic viscosity of about 15 to about 30 or about 18 to about 25 cSt @ 100° C.; a viscosity index of about 5 to about 30; a pour point (ASTM D5949) of about −6° to about 4° C.; an aromatic content (Clay Gel Analysis ASTM D2007) of about 30 to about 55 weight percent, about 30 to about 50 weight percent or about 35 to about 48 weight percent; a saturates content (Clay Gel Analysis ASTM D2007) of about 40 to about 65, about 40 to about 55 or about 42 to about 52 weight percent; a polar compounds content (Clay Gel Analysis ASTM D2007) of about 0.4 to about 1, about 0.4 to about 0.9 or about 0.5 to about 0.8 weight percent; a VGC of about 0.86 to about 0.89; a PCA extract content less than 3 weight percent, e.g. from 1 to 3 or 1 to 2 weight percent, based on the total weight of hydrocarbons contained in the oil composition as determined according to IP 346; and a PAH 8-markers content less than 10 ppm when evaluated according to European standard EN 16143:2013.

The modified naphthenic process oil may be used in a variety of rubber formulations. Exemplary rubber formulations typically will contain a high proportion of aromatic groups, and include styrene-butadiene rubber (SBR), butadiene rubber (BR), ethylene-propylene-diene monomer rubber (EPDM) and natural rubber. Rubber formulations containing the modified naphthenic process oil may contain vulcanizing agents (e.g., sulfur compounds), fillers or extenders (e.g., carbon black and silica) and other ingredients that will be familiar to persons having ordinary skill in the art. The rubber formulations may be cured to form a variety of rubber-containing articles that will be familiar to persons having ordinary skill in the art, including tires, belts, hoses, gaskets and seals. The effect of the modified process oil may be assessed using a variety of tests that will be familiar to persons having ordinary skill in the art. For example, rubber formulations used to make tires may be evaluated by measuring wet grip (tan delta at 0° C.), rolling resistance (tan delta at 60° C.), skid resistance, abrasion resistance, dry traction and processability.

The invention is further illustrated in the following non-limiting examples, in which all parts and percentages are by weight unless otherwise indicated.

Example 1

LS2000 non-hydrotreated naphthenic vacuum gas oil (from Ergon, Inc., and having the properties shown below in Table 3) was combined at an 85:15 volume ratio with ValAro™ 130A DAE (from Valero Marketing and Supply Co., and having the properties shown below in Table 4) to form a blended feedstock identified as "DAE Blend". In a series of runs identified as A-2, B-2, C-2 and D-2, the DAE Blend was subjected to a variety of hydrotreating conditions. The conditions and properties of the non-hydrotreated DAE Blend feedstock and the hydrotreated DAE Blends are shown below in Table 5:

TABLE 3

LS2000 Properties

| Test description | Test Method | Test Value |
| --- | --- | --- |
| API Gravity | ASTM D1250 | 18.5 |
| Sp. gr. @ 15.6/15.6° C. (60/60° F.) | ASTM D1298 | 0.9437 |
| Sulfur, wt % | ASTM D4294 | 0.6738 |
| Aniline Pt., ° C. | ASTM D611 | 87 |
| Flash point, COC, ° C. | ASTM D92 | 282 |
| UV Absorp. @ 260 nm | ASTM D2008 | 15.6 |
| Refractive Index @ 20° C. | ASTM D1218 | 1.5240 |
| Viscosity, cSt @38° C. (100° F.) | ASTM D445 | 646 |
| Viscosity, cSt.@99° C. (210° F.) | ASTM D445 | 25 |
| Viscosity, SUS@38° C. (100° F.) | ASTM D445 | 3595 |
| Viscosity, SUS@99° C. (210° F.) | ASTM D445 | 126 |
| Color, ASTM | ASTM D6045 | 6.6 |
| Pour Point, ° C. | ASTM D5949 | −12 |
| VGC | ASTM D2501 | 0.873 |
| Clay Gel, wt. %: | ASTM D2007 | |
| Asphaltenes | | <0.1 |
| Saturates | | 46.2 |
| Polars | | 10.4 |
| Aromatics | | 43.4 |
| Carbon Analysis | ASTM D2140 | |
| $C_A$, % | | 21 |
| $C_N$, % | | 33 |
| $C_P$, % | | 46 |
| Distillation D2887 | ASTM D2887 | |
| Initial BP, ° C. (° F.) | | 376 (709) |
| 5%, ° C. (° F.) | | 434 (814) |
| 10%, ° C. (° F.) | | 450 (842) |
| 30%, ° C. (° F.) | | 483 (901) |
| 50%, ° C. (° F.) | | 506 (942) |
| 70%, ° C. (° F.) | | 529 (984) |
| 90%, ° C. (° F.) | | 558 (1037) |
| 95%, ° C. (° F.) | | 570 (1058) |
| Final BP, ° C. (° F.) | | 586 (1087) |

TABLE 4

ValAro 130A Properties

| Test description | Test Method | Test Value |
| --- | --- | --- |
| API Gravity | ASTM D1250 | 9.7 |
| Sp. gr. @ 15.6/15.6° C. (60/60° F.) | ASTM D1298 | 0.990/1.017 |
| Sulfur, wt % | ASTM D4294 | 5.5 max |
| Aniline Pt., ° C. | ASTM D611 | 51.7 max |
| Flash point, COC, ° C. | ASTM D92 | 210 min |
| Refractive Index @ 20° C. | ASTM D1218, by extrapolation from diluted samples | 1.5519 |
| Viscosity, cSt.@100° C. (212° F.) | ASTM D445 | 24/30 |
| Viscosity, SUS@99° C. (210° F.) | ASTM D445 | 118/149 |
| Viscosity, SUS@38° C. (100° F.) | ASTM D445 | 7483 |
| Viscosity, SUS@99° C. (210° F.) | ASTM D445 | 143 |
| Pour Point, ° C. | ASTM D5949 | 30 max |
| VGC | ASTM D2501 | 0.925-0.965 |
| Clay Gel, wt. %: | ASTM D2007 | |
| Asphaltenes | | 0.1 max |
| Saturates | | |
| Polars | | 7-16 |
| Aromatics | | 65 min |
| Carbon Analysis | ASTM D2140 | |
| $C_A$, % | | 34 |
| $C_N$, % | | 54 |
| $C_P$, % | | 13 |
| Carbon Analysis | ASTM D3238 | |
| $C_A$, % | | 31 |
| $C_N$, % | | 53 |
| $C_P$, % | | 16 |

TABLE 5

DAE Blend Feedstock and Hydrotreated DAE Blend Properties

| Description | Feedstock | A-2 | B-2 | C-2 | D-2 |
| --- | --- | --- | --- | --- | --- |
| LHSV (hr$^{-1}$) | — | 0.56 | 0.67 | 0.62 | 0.63 |
| WRAT ° C. (° F.) | — | 329 (625) | 329 (625) | 343 (650) | 315 (598) |
| API Gravity | 13.04 | 20.7 | 20.56 | 21.16 | 20.12 |
| Sp.gr. @ 15.6/15.6° C. (60/60° F.) | 0.979 | 0.9297 | 0.9306 | 0.9269 | 0.9333 |
| Sulfur, wt. % | 3.808 | 0.31 | 0.316 | 0.206 | 0.41 |
| Sulfur, ppm | 38081 | 3103 | 3162 | 2061 | 4095 |
| Aniline Pt. ° C. (° F.) | 61 (141) | 93 (199) | 92 (197) | 93 (200) | 91 (196) |
| Flash point, COC, ° C. (° F.) | 257 (495) | 252 (485) | 260 (500) | 260 (500) | 263 (505) |
| UV Absorp. @ 260 nm | 20.4 | 7.8 | 7.8 | 3.3 | 10.9 |
| RI @ 20° C. | out of range | 1.5131 | 1.5138 | 1.5109 | 1.5161 |
| cSt @38° C. (100° F.) | 960 | 432.2 | 464.3 | 421.6 | 515 |
| cSt.@99° C. (210° F.) | 127.5 | 19.5 | 20.2 | 19.2 | 21.2 |
| SUS@38° C. (100° F.) | 4449 | 2002 | 2151 | 1953 | 2384 |
| SUS@99° C. (210° F.) | 127.46 | 95.8 | 98.5 | 94.6 | 102.7 |
| Color, ASTM | Too Dark | 1.7 | 1.8 | 1.7 | 2 |
| Pour Point, ° C. (° F.) | 19 (66) | −15 (5) | −15 (5) | −12 (10) | −12 (10) |

TABLE 5-continued

DAE Blend Feedstock and Hydrotreated DAE Blend Properties

| Description | Feedstock | A-2 | B-2 | C-2 | D-2 |
|---|---|---|---|---|---|
| VGC | 0.924 | 0.858 | 0.859 | 0.854 | 0.861 |
| Nitrogen (total) ppmw | 1973 | 1009 | 1125 | 811 | 1330 |
| NMR Wax, wt. % | 5.85 | 3.12 | 3.01 | 3.23 | 1.75 |
| NMR Hydrogen Content, wt. % | 9.035 | 11.087 | 10.917 | 11.188 | 10.636 |
| HPLC Analysis, wt. %, D6591: | | | | | |
| Mono | 17.26 | 29.30 | 28.34 | 29.80 | 26.18 |
| Di | 15.26 | 10.60 | 10.84 | 11.46 | 10.16 |
| Tri + | 44.34 | 18.38 | 19.31 | 15.98 | 20.65 |
| Clay Gel, wt. %: | | | | | |
| Asphaltenes | — | — | — | — | — |
| Saturates | 35.74 | 56.84 | 55.36 | 58.66 | 55.75 |
| Polars | 0.64 | 0.43 | 0.45 | 0.41 | 0.44 |
| Aromatics | 63.62 | 42.73 | 44.19 | 40.93 | 43.81 |
| Carbon Analysis | | | | | |
| $C_A$, % | — | 17 | 17 | 15 | 18 |
| $C_N$, % | — | 31 | 30 | 32 | 29 |
| $C_P$, % | — | 53 | 53 | 53 | 52 |
| Distillation D2887 | | | | | |
| Initial BP, ° C. (° F.) | 356 | 337 | 357 | 347 | 375 |
| | (673) | (638) | (674) | (657) | (707) |
| 5%, ° C. (° F.) | 407 | 403 | 409 | 403 | 414 |
| | (764) | (758) | (768) | (758) | (777) |
| 10%, ° C. (° F.) | 431 | 424 | 427 | 424 | 431 |
| | (808) | (796) | (801) | (795) | (807) |
| 20%, ° C. (° F.) | 397 | 446 | 448 | 446 | 451 |
| | (747) | (835) | (838) | (834) | (843) |
| 30%, ° C. (° F) | 476 | 463 | 464 | 462 | 466 |
| | (888) | (865) | (867) | (863) | (871) |
| 40%, ° C. (° F.) | 488 | 477 | 478 | 476 | 480 |
| | (911) | (891) | (893) | (889) | (896) |
| 50%, ° C. (° F) | 500 | 492 | 493 | 491 | 494 |
| | (932) | (917) | (919) | (916) | (922) |
| 60%, ° C. (° F.) | 511 | 506 | 507 | 505 | 508 |
| | (951) | (942) | (944) | (941) | (946) |
| 70%, ° C. (° F.) | 523 | 522 | 522 | 520 | 523 |
| | (973) | (971) | (972) | (968) | (974) |
| 80%, ° C. (° F.) | 537 | 539 | 539 | 537 | 540 |
| | (998) | (1003) | (1003) | (999) | (1004) |
| 90%, ° C. (° F.) | 556 | 563 | 562 | 559 | 562 |
| | (1033) | (1046) | (1043) | (1039) | (1044) |
| 95%, ° C .(° F.) | 570 | 577 | 577 | 574 | 577 |
| | (1058) | (1071) | (1070) | (1066) | (1070) |
| End Point, ° C. (° F.) | 596 | 607 | 603 | 599 | 602 |
| | (1104) | (1124) | (1118) | (1110) | (1115) |
| 8-markers by GC/MS | 337.4 | <1.0 | <1.0 | <1.0 | 33.2 |

The results shown in Table 5 demonstrate significant reductions in PAH levels (as measured by 8-marker levels) and significant improvements in other finished product properties such as aniline point, refractive index, VGC and aromatic content. The $C_A$ contents of the hydrotreated blends were greater than the 13% $C_A$ content of LS2000 naphthenic vacuum gas oil when similarly hydrotreated.

Example 2

The hydrotreated DAE Blends from Table 5 may be evaluated as process oils in a silica-filled passenger tire tread formulation containing the ingredients shown below in Table 6. This tire tread formulation is not that of any particular manufacturer, but instead represents a commonly-used formulation that is often employed in technical papers and other evaluations describing potential new rubber formulation ingredients.

TABLE 6

Passenger tire tread compound formulation

| Ingredient | Loading, PHR | Included in stage(s) |
|---|---|---|
| Buna VSL Vp PBR 4041 unextended SBR rubber (Lanxess) | 70 | Masterbatch, $1^{st}$ components |
| Neo-cis BR rubber | 30 | Masterbatch, $1^{st}$ components |
| Process oil | 37.5 | Masterbatch, $1^{st}$, $2^{nd}$ and $3^{rd}$ additions |
| ZEOSIL ™ 1165MP silica filler (Rhodia) | 80 | Masterbatch, $1^{st}$, $2^{nd}$ and $3^{rd}$ additions |
| Wax | 2.50 | Masterbatch, $3^{rd}$ addition |
| SANTOFLEX ™ 6PPD antioxidant (Eastman) | 1.00 | Masterbatch, $3^{rd}$ addition |
| poly(2,2,4-trimethyl-1,2-dihydroquinoline) antioxidant (Flectol H) | 1.00 | Masterbatch, $3^{rd}$ addition |
| X50S ™ (1:1 blend of Si 69 ™ and N330 carbon black, Evonik) | 12.8 | Masterbatch, $2^{nd}$ addition |
| Zinc oxide | 3.00 | Remill stage |
| Stearic acid | 2.00 | Remill stage |
| Sulfur | 1.40 | Final stage |
| Diphenylguanidine accelerator | 2.00 | Final stage |
| N-t-butylbenzothiazole-2-sulfenamide accelerator | 1.70 | Final stage |

The formulation ingredients may be mixed in a Banbury mixer at a batch weight of 3.3 kg using the mixing conditions shown below in Table 7. The rotor speed may be adjusted during the Masterbatch stage to prevent the Masterbatch temperature exceeding 155° C. In order to facilitate silane coupling, the batch temperature may be held above 140° C. for 3 minutes following addition of the X50S additive. A 3 minute remill stage may be employed during which the rotor speed may be adjusted to keep the temperature below 155° C. A 2 minute finalization stage may be employed during which the rotor speed may be adjusted to keep the temperature below 100° C.

TABLE 7

Mixing conditions

| Stage | Rotor speed, rpm | Coolant temperature, ° C. |
|---|---|---|
| Masterbatch | 75 | 40 |
| Remill | 75 | 40 |
| Finalize | 50 | 40 |

Mooney viscosity characteristics of the resulting rubber formulations may be made at 100° C. using a Mooney rotating disc viscometer equipped with a large rotor, and rheometric measurements may be made at 172° C. using a moving die rheometer and a 30 minute plot. Other physical properties that may be measured include dynamic properties at 10 Hz and 1% strain over the temperature range −40 to 60° C., tensile strength in MPa, % extension at break, Shore A hardness, crescent tear strength, abrasion resistance index (Akron abrasion), compression set (7 days, 70° C.), Goodrich heat build-up characteristics, and loss angle (or tangent of the loss angle Tan δ) at about 60° and 0° respectively. Tan δ is a measure of rubber hysteresis, viz., energy stored in the rubber that is not recoverable as the rubber is stretched or compressed. For tire formulations normally a low Tan δ at 60° C. is indicative of a low tire tread rolling resistance, and a high Tan δ at 0° C. is indicative of good tread grip in wet conditions. Skid resistance may be measured using a British Pendulum Skid Resistance apparatus operated according to BS EN 13036-4 (2011) on smooth concrete block wet with room temperature (22° C.) distilled water, and with the test pieces being prepared using 3-micrometer lapping paper. Higher values represent better skid resistance. For tire manufacturing, some test results have greater importance than others. As a generalization, results for processability, abrasion resistance, tan δ at 60° C. and 0° C., and skid resistance may be especially important. Tensile samples and hardness buttons made from each rubber formulation may also be aged in a laboratory fan convection oven at 70° C. for 7 days and evaluated for changes in the above physical properties.

The above description is directed to the disclosed processes and is not intended to limit them. Those of skill in the art will readily appreciate that the teachings found herein may be applied to yet other embodiments within the scope of the attached claims. The complete disclosures of all cited patents, patent documents, and publications are incorporated herein by reference as if individually incorporated. However, in case of any inconsistencies the present disclosure, including any definitions herein, will prevail.

We claim:

1. A method for making naphthenic process oils, the method comprising:
   a) blending residual bottoms from a naphthenic crude atmospheric distillation unit with a high aromatic carbon content ($C_A$) distilled aromatic extract feedstock to provide a blended oil having at least about 10 wt. % high ($C_A$) content feedstock based upon the weight of the blended oil, the residual bottoms having a boiling point above about 370° C., the high $C_A$ distilled aromatic extract feedstock having a viscosity-gravity constant (VGC) greater than 0.95 as determined by ASTM D2501, wherein the high $C_A$ distilled aromatic extract feedstock is obtained from solvent extraction of a paraffinic crude distillate and contains at least about 20% $C_A$ content and up to about 65% $C_A$ content;
   b) vacuum distilling the blended oil obtained from step a) to provide one or more naphthenic vacuum gas oils in one or more viscosity ranges containing at least about 40% $C_A$ plus $C_N$ content and having a viscosity gravity constant (VGC) between 0.855 and 0.895; and
   c) hydrotreating at least one of the one or more naphthenic vacuum gas oils obtained from step b) to provide an enhanced $C_A$ content naphthenic process oil;
   wherein the high $C_A$ distilled aromatic extract feedstock and enhanced aromatic carbon ($C_A$) content naphthenic process oil each have greater aromatic carbon ($C_A$) content than that of a comparison oil made by similarly vacuum distilling and hydrotreating the residual bottoms alone without blending step a); and
   wherein the enhanced $C_A$ content naphthenic process oil has a reduced aniline point and an increased VGC value compared to the one or more vacuum gas oils hydrotreated alone without blending step a), wherein the reduced aniline point is between about 64° C. and about 85° C. for enhanced $C_A$ content naphthenic process oils having a viscosity between about 35 and about 85 SUS at 38° C., the reduced aniline point is between about 64° C. and about 85° for enhanced $C_A$ content naphthenic process oils having a viscosity between about 85 and about 135 SUS at 38° C., the reduced aniline point is between about 77° C. and about 98° for enhanced $C_A$ content naphthenic process oils having a viscosity between about 450 and about 600 SUS at 38° C., or the reduced aniline point is between about 90° C. and about 110° C. for enhanced $C_A$ content naphthenic process oils having a viscosity between about 1700 and about 2500 SUS at 38° C. (100° F.), as measured according to ASTM D611.

2. A method for making naphthenic process oils, the method comprising:
   a) blending naphthenic crude with a high aromatic carbon content ($C_A$) distilled aromatic extract feedstock to provide a blended oil, the naphthenic crude containing at least about 30% naphthenic carbon ($C_N$) content and less than about 70% paraffinic carbon ($C_P$) content plus $C_A$ content as measured according to ASTM D2140, the high $C_A$ distilled aromatic extract feedstock containing at least 20% $C_A$ content as measured according to ASTM D2140 and having a viscosity-gravity constant (VGC) greater than 0.95 as determined by ASTM D2501, wherein the high $C_A$ distilled aromatic extract feedstock is obtained from solvent extraction of a paraffinic crude distillate and contains at least about 20% and up to about 65% $C_A$ content;
   b) atmospheric distilling the blended oil to provide one or more atmospheric gas oils in one or more viscosity ranges and residual bottoms;
   c) vacuum distilling the residual bottoms to provide one or more vacuum gas oils in one or more additional viscosity ranges, wherein the one or more naphthenic vacuum gas oils have an aniline point of about 72° C. to about 110° C. according to ASTM D611; and
   d) hydrotreating at least one of the one or more of the vacuum gas oils to provide an enhanced $C_A$ content naphthenic process oil;
   wherein the high $C_A$ distilled aromatic extract feedstock and enhanced $C_A$ content naphthenic process oil each have greater aromatic carbon ($C_A$) content than that of a comparison oil made by similarly atmospheric distilling, vacuum distilling and hydrotreating the naphthenic crude alone; and
   wherein the enhanced $C_A$ content naphthenic process oil has a reduced aniline point and an increased VGC value compared to the one or more vacuum gas oils hydrotreated alone without blending step a), wherein the reduced aniline point is between about 64° C. and about 85° C. for enhanced $C_A$ content naphthenic process oils having a viscosity between about 35 and about 85 SUS at 38° C., the reduced aniline point is between about 64° C. and about 85° for enhanced $C_A$ content naphthenic process oils having a viscosity between about 85 and about 135 SUS at 38° C., the reduced aniline point is between about 77° C. and about 98° for enhanced $C_A$ content naphthenic process oils having a viscosity between about 450 and about 600 SUS at 38° C., or the reduced aniline point is between about 90° C. and about 110° C. for enhanced $C_A$ content naphthenic process oils having a viscosity between about 1700 and about 2500 SUS at 38° C. (100° F.), as measured according to ASTM D611.

3. The method according to claim 1, wherein the vacuum gas oil contains at least about 10% $C_A$ content and the blended oil contains about 10 wt. % to about 40 wt. % distilled aromatic extract feedstock based on the weight of the blended oil.

4. The method according to claim 1, wherein the distilled aromatic extract feedstock is fractionated to isolate oils that distill in the same general range as at least one of the vacuum gas oils.

5. The method according to claim 1 or 2, wherein the vacuum gas oil has a viscosity from about 100 to about 3,500 SUS at 38° C.

6. The method according to claim 1, wherein the enhanced $C_A$ content naphthenic process oil has a viscosity of about 100 to about 2000 SUS at 38° C.

7. The method according to claim 1, wherein the enhanced $C_A$ content naphthenic process oil has reduced unsaturation and reduced amounts of sulfur-, nitrogen- or oxygen— containing compounds compared to the vacuum gas oil.

8. The method according to claim 1, wherein the enhanced $C_A$ content naphthenic process oil has increased $C_A$ content, increased UV absorption and refractive index, compared to the at least one vacuum gas oil.

9. The method according to claim 1 or 2, wherein the enhanced $C_A$ content naphthenic process oil has less than about 10 ppm PAH 8-markers when evaluated according to European standard EN 16143:2013.

10. The method according to claim 1, wherein the residual bottoms are blended with the distilled aromatic extract feedstock and the blend subjected to vacuum distillation.

11. The method according to claim 2, wherein the naphthenic crude is blended with the distilled aromatic extract feedstock and the blend subjected to vacuum distillation.

12. The method according to claim 1, further comprising a step of solvent extraction, catalytic dewaxing, solvent dewaxing, hydrofinishing or hydrocracking.

13. The method according to claim 1, wherein steps of deasphalting, solvent extraction, catalytic dewaxing, solvent dewaxing, hydrofinishing and hydrocracking are not employed.

14. The method according to claim 1 or 2, wherein the enhanced $C_A$ naphthenic process oil has the following desirable characteristics separately or in combination: a flash point according to Cleveland Open Cup, ASTM D92 of at least about 240° C.; a boiling point (corrected to atmospheric pressure) of about 320° to about 650° C.; a kinematic viscosity of about 15 to about 30 cSt @ 100° C. according to ASTM D445; a viscosity index of about 5 to about b 30; a pour point according to ASTM D5949 of about −6° to about 4° C.; an aromatic content according to Clay Gel Analysis ASTM D2007 of about 30 to about 55 weight percent; a saturates content (Clay Gel Analysis ASTM D2007) of about 40 to about 65 weight percent; a polar compounds content according to Clay Gel Analysis ASTM D2007 of about 0.4 to about 1 weight percent; a VGC of about 0.86 to about 0.89; a PCA extract content less than 3 weight percent as determined according to IP 346; and a PAH 8-markers content less than 10 ppm when evaluated according to European standard EN 16143:2013.

15. The method according to claim 1 or 2, further comprising combining the enhanced $C_A$ content naphthenic process oil with a rubber formulation.

16. The method according to claim 15, further comprising forming a tire from the rubber formulation.

* * * * *